O. B. & L. A. FULLER.
WINDMILLS.
No. 194,140. Patented Aug. 14, 1877.
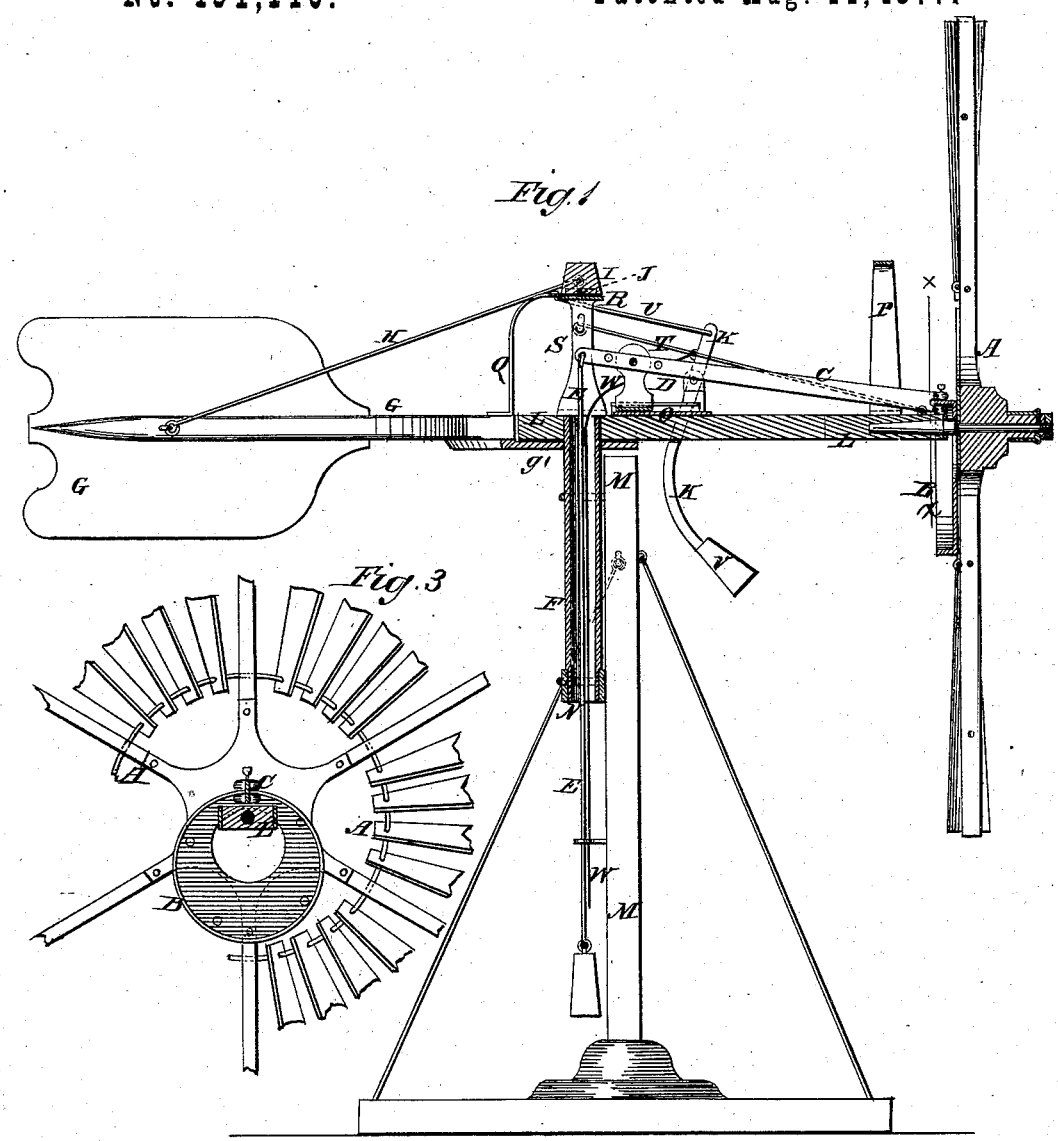
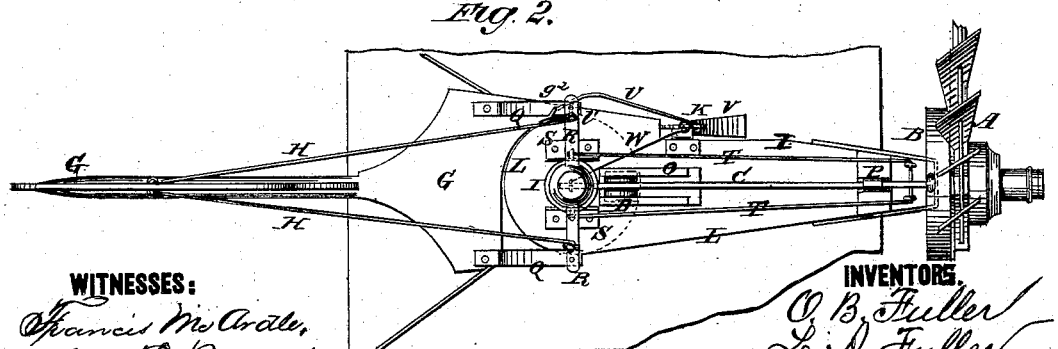
WITNESSES:
Francis McArdle,
Alex F. Roberts
INVENTORS.
O. B. Fuller
L. A. Fuller
BY
Munn
ATTORNEYS.

UNITED STATES PATENT OFFICE.

OSCAR B. FULLER AND LEONARD A. FULLER, OF MOUNT PULASKI, ILLINOIS.

IMPROVEMENT IN WINDMILLS.

Specification forming part of Letters Patent No. 194,140, dated August 14, 1877; application filed January 19, 1877.

*To all whom it may concern:*

Be it known that we, OSCAR B. FULLER and LEONARD A. FULLER, of Mount Pulaski, in the county of Logan and State of Illinois, have invented a new and useful Improvement in Wind-Wheels, of which the following is a specification:

Figure 1 is a side view of our improved wind-wheel, partly in section to show the construction. Fig. 2 is a top view of the same. Fig. 3 is a rear view of the wheel, the beam or plate and the lever being shown in section through the line $x\,x$, Fig. 1.

Similar letters of reference indicate corresponding parts.

The object of this invention is to furnish an improved wind-wheel, which shall be simple in construction, inexpensive in manufacture, reliable in operation, and easily controlled.

The invention will first be described in connection with the drawing, and then pointed out in the claim.

A is the wheel, which is formed by attaching wings to the radial arms of a hub. The wheel A revolves upon a journal formed upon or attached to the outer end of a bar or beam, L. The inner end of the bar L is rigidly attached to the upper end of the tube F, which works in keepers attached to the post, frame, or tower M, that supports the wheel A. The lower end of the tube F revolves in a hollow step, N, attached to the post, frame, or tower M.

To the inner side of the wheel A is attached an eccentric flange, B, to receive the forked outer end of the lever C. The ends of the forks of lever C may have brass bearings attached to them to bear upon the eccentric flange, which bearings we prefer to make cylindrical in side view and oval in front view. The upper arm or bearing of the fork of the lever C is provided with an oil-cup to keep the flange B oiled. The lever C is pivoted to a short fulcrum-post, D, the lower end of which has a T formed upon it, to fit into a T-groove formed in the plate O attached to the bar or beam L, so that the fulcrum-point may be adjusted as required. To the inner end of the lever C is attached the upper end of the rod E, which passes down through the tube F and hollow step N, and from the lower end of which motion is taken to the machinery to be driven.

The forward part of the lever C is kept from lateral movement by a slotted standard, P, attached to the bar or beam L, and through the slot of which the said lever C passes.

The flange B and lever C may be connected with a wind-wheel attached to the shaft, or to the shaft to which the said wheel is attached, if desired.

G is the vane, to the under side of the shank of which is attached, or upon it is formed, a plate, $g^1$, which underlaps the inner end of the bar or beam L, and has a hole formed through it, through which the tube F passes.

To the opposite sides of the upper side of the vane-shank are attached the lower ends of two standards, Q, the ends of which are connected by a cross-bar, R, and which are curved forward, so as to bring the said cross-bar R directly over the tube F.

In the center of the cross-bar R is formed a socket, I, to receive a pin, J, attached to the bow of the U-standard S, the ends of which are attached to the bar or beam L upon the opposite sides of the upper end of the tube F. The vane G is further supported in a horizontal position by the chains or cords H, the outer ends of which are attached to the opposite sides of the middle part of the vane G. The inner ends of the chains or cords H are attached to the end parts of the cross-bar R. The U-standard S is strengthened by the chains or cords T, the inner ends of which are attached to the upper parts of the arms of the U-bar S, and their outer ends are attached to the outer end of the bar or beam L.

The inner end of the bar or beam L is rounded off, and the inner end of the shank of the vane G is concaved to fit upon it, so that the vane G may turn upon the tube F and the pivot J.

Upon one end of the shank of the vane G is formed an arm, $g^2$, which strikes against a shoulder, $l'$, formed upon the side of the inner end of the bar or beam L. By this arrangement the vane G cannot turn out of line with the bar or beam L in one direction, but may turn in the other direction into a position at right angles with said bar or beam L.

To the end of the standard Q or cross-bar R, over the arm $g^2$ of the shank of the vane G, is attached one end of a short rod or chain, U, the other end of which is attached to the upper end of the bent lever K. The bent lever K is pivoted at its angle to the side of the bar or beam, or to a support attached to said bar or beam.

To the other end of the bent lever K is attached a weight, V, sufficient to keep the vane G in line with the bar or beam L, and thus hold the wheel to the wind.

To the upper arm of the bent lever K is attached the end of a cord or chain, W, which passes down through the tube F into such a position that it may be reached and operated by the attendant.

By this arrangement, by pulling upon the cord or chain W the vane G will be drawn around into a position at right angles with the bar or beam L, so that the wind itself may turn the wheel A out of the wind. By releasing the cord or chain W the weight V will turn the vane G back into line with the bar or beam L, and bring the wheel A again into the wind.

If desired, the cord or chain W may be secured in position to hold the vane G at any desired angle with the bar or beam L, so that it may hold the wheel A more or less to the wind, as may be desired.

A special advantage of our improved wind-wheel is that the lever C so greatly increases the power of the wheel that it may be used for raising water from deep wells while using a small wheel, which could not be done with the old construction, as the resistance of the pump was so great that the wheel had to be made very large, and on this account was very expensive in construction, and very liable to be broken by a heavy wind.

Having thus described our invention, we claim as new and desire to secure by Letters Patent—

The combination, with wheel-beam L and vane-beam G, turning together about tube F, and the latter turning independently in one direction, of the frame Q R, whose socket I is arranged over tube, the bow-standard S, and the chains H, all arranged as and for the purpose set forth.

OSCAR B. FULLER.
LEONARD A. FULLER.

Witnesses:
A. F. DANNER,
M. WEMPLE.